United States Patent [19]
Iso et al.

[11] Patent Number: 5,617,136
[45] Date of Patent: Apr. 1, 1997

[54] IMAGE FREEZING UNIT FOR OBTAINING STILL IMAGE AT A PRECISE TIMING FROM IMAGE DATA OBTAINED BY THE IMAGING MEANS

[75] Inventors: Ryouichi Iso, Hachioji; Kazunari Nakamura, Hino, both of Japan

[73] Assignee: Olympus Optical Co., Ltd., Tokyo, Japan

[21] Appl. No.: 405,991

[22] Filed: Mar. 17, 1995

[30] Foreign Application Priority Data

Apr. 22, 1994 [JP] Japan .................... 6-084851

[51] Int. Cl.⁶ .................... A61B 13/00; A61B 1/04
[52] U.S. Cl. .................... 348/71; 348/65; 348/70
[58] Field of Search .................... 348/65, 68, 70, 348/71, 77

[56] References Cited

U.S. PATENT DOCUMENTS

| | | |
|---|---|---|
| Re. 34,504 | 1/1994 | Uehara et al. . |
| 4,901,143 | 2/1990 | Uehara et al. . |
| 4,933,757 | 6/1990 | Kanno et al. .................... 358/98 |
| 5,032,913 | 7/1991 | Hattori et al. . |
| 5,164,824 | 11/1992 | Ieoka et al. .................... 358/98 |
| 5,331,949 | 7/1994 | Funakoshi et al. .................... 348/69 |
| 5,333,010 | 7/1994 | Nakamura et al. . |
| 5,339,159 | 8/1994 | Nakamura et al. . |
| 5,408,263 | 4/1995 | Kikuchi et al. .................... 348/68 |
| 5,408,265 | 4/1995 | Sasaki .................... 348/70 |

*Primary Examiner*—Howard W. Britton
*Assistant Examiner*—Vincent F. Boccio
*Attorney, Agent, or Firm*—Armstrong, Westerman, Hattori, McLeland & Naughton

[57] ABSTRACT

A freezing unit of the present invention includes a color discrepant magnitude detection unit for accumulating the color corrected magnitude for each pixel output from a color discrepancy correction circuit, and detecting it as the color discrepant magnitude for one field. The freezing unit also includes a comparator circuit including a memory for storing the color discrepant magnitudes for sixteen fields, and a comparator for comparing the color discrepant magnitudes for sixteen fields to search a field with the least color discrepant magnitude, and a memory for storing sixteen field images. The freezing unit further includes a reference position selection circuit for selecting the reference position of the image by the freezing signal, and an image selection circuit for selecting the address of an image of a field with the least color discrepant magnitude.

17 Claims, 18 Drawing Sheets

IMAGE FREEZING UNIT FOR OBTAINING STILL IMAGE AT A PRECISE TIMING FROM IMAGE DATA OBTAINED BY THE IMAGING MEANS

BACKGROUND OF THE INVENTION

1. Field of the Invention

The present invention relates to an image freezing unit for obtaining a still image from image data obtained by an imaging means.

2. Related Art

Recently, an endoscopic imaging unit has been developed, in which there is provided a solid-state imaging element such as a CCD at the tip of an endoscope, and the inside of body cavity is illuminated sequentially with trichromatic lights of red, green and blue so as to image the inside in color, and then a diagnosis is pronounced on the basis of the color-image displayed on a monitor unit. In this method, it is required to image trichromatic component images in order to image a color image. Thus, it takes time and tends to cause color discrepancy on the image due to the accidental movement of an object or an operator's hand. In addition, in the event of observing a still image on the monitor unit, when a freeze command is executed to the endoscopic imaging unit, a freezing operation for the unit is unconditionally performed in accordance with the command to obtain a still image.

Therefore, when executing the freeze command while the object and the position of the endoscope tip move relatively, color discrepancy or image blurred on the still image occurs. Conventionally, for example, as shown in the official gazette of the Japanese provisional publication No. 212591/92, a freezing unit has been presented, wherein a still image with the least amount of color discrepancy can be obtained from images after a predetermined time has passed since the execution of freeze command.

Further, for example, as in the official gazette of the Japanese provisional publication No. 154100/93, a freezing unit has been presented, wherein whenever a desired scene is required to be frozen, a still image with a color discrepant magnitude below a predetermined value can be obtained without any perceived time delay.

Further, for example, in the official gazette of the Japanese provisional publication No. 279689/89, a freezing unit has been presented, wherein an image stored in a memory is compared after the freeze command is executed, so as to obtain a still image with the least amount of color discrepancy.

However, the freezing means in the publication No. 212591/92 described above provides an image with the least amount of color discrepancy after a predetermined time has passed since the execution of freeze command, so a time difference caused by the response time of an operator occurs between an image to be frozen and an image actually obtained.

Further, the color discrepancy preventive means in the publication No. 154100/93 described above provides a still image at a color discrepant magnitude below a determined value, so the image quality is unsatisfactory when compared with an image with the least color discrepancy, and a previous image may be output when the freeze command is executed while the image with the color discrepant magnitude below the determined value is not updated yet.

Further, the color discrepancy preventive means in the publication No. 279689/89 described above, detects an image with the least amount of color discrepant magnitude from images stored in a memory after the execution of the freeze command, so it takes time for evaluation, and there is a certain lag time until a still image is actually obtained.

SUMMARY OF THE INVENTION

An object of the present invention is to provide an image freezing unit capable of preventing the time lag until an image is output after the freeze command is executed, by regularly detecting an image with the amount of color discrepancy or a minimally blurred image, with a simple configuration.

Another object of the present invention is to provide an image freezing unit capable of obtaining the still image of a required scene easily, by taking account of the time difference caused by the response time of an operator, so as to output the still image with the least color discrepancy or a minimally blurred image.

An image freezing unit according to the present invention comprises an imaging means for imaging an object, an image data storage means for storing image data comprising a plurality of still images obtained by said imaging means, a variation calculation means for calculating a variation based on the relative positions between said object and said imaging means, on the basis of said still image formed of said image data stored in said image data storage means, a variation latch means for holding said variation calculated by said variation calculation means, an image detection means for detecting said still image based on said variation held by said variation latch means, and a control means for controlling said image data storage means on the basis of the result detected by said image detection means.

In the accompanying drawings, there are shown illustrative embodiments of the invention from which these and other of its objectives, novel features, and advantages will be readily apparent.

BRIEF DESCRIPTION OF THE DRAWINGS

FIG. 1 is a structural block diagram illustrating a configuration of an endoscope provided with a freezing unit of the present embodiment;

FIG. 2 is an explanatory diagram illustrating the production of image from image data obtained by the area sequential-type electronic endoscope shown in FIG. 1;

FIG. 3 is a block diagram illustrating the configuration of the freezing unit in FIG. 1;

FIG. 4 is a block diagram illustrating the configuration of the color discrepancy preventive circuit in FIG. 3;

FIG. 5 is an explanatory diagram illustrating the operation of a line counter of the color discrepancy magnitude detection circuit in FIG. 4;

FIG. 6 is an explanatory diagram describing the operation of the color discrepancy preventive circuit in FIG. 3;

FIG. 7 is an explanatory diagram illustrating an example of the first selection of a position on the comparison operation by a reference position selection circuit in FIG. 3;

FIG. 8 is an explanatory diagram illustrating an example of the second selection of a position on the comparison operation by the reference position selection circuit in FIG. 3;

FIG. 9 is an explanatory diagram illustrating an example of the third selection of a position on the comparison operation by the reference position selection circuit in FIG. 3;

FIG. 10 is an explanatory diagram illustrating the operation of a memory in FIG. 4;

FIG. 11 is a block diagram illustrating the configuration of the freezing unit of FIG. 1 in a modified embodiment, to which a color discrepancy correction circuit is applied;

FIG. 12 is a block diagram illustrating the configuration of the color discrepancy detection circuit in FIG. 11; and FIG. 13 is a block diagram illustrating a histogram production circuit and a color discrepancy decision circuit shown in FIG. 12.

FIG. 14 is a block diagram illustrating the freezing unit;

FIG. 15 is a diagram showing an image arrangement on the virtual screen of the color discrepancy correction circuit to be converted by a format conversion circuit shown in FIG. 14; and FIG. 16 is an explanatory diagram illustrating the operation of the format conversion circuit shown in FIG. 14.

FIG. 17 is an explanatory diagram illustrating the production of images from the image data imaged by the simultaneous type electronic endoscope;

FIG. 18 is a block diagram illustrating the configuration of the freezing unit;

FIG. 19 is a block diagram illustrating the configuration of an image blurred magnitude detection circuit in FIG. 18;

FIG. 20 is an explanatory diagram illustrating the operation of the memory in FIG. 18;

DETAILED DESCRIPTION OF THE PREFERRED EMBODIMENTS

Embodiments of the present invention will now be described by referring to the accompanying drawings.

Figure 1:
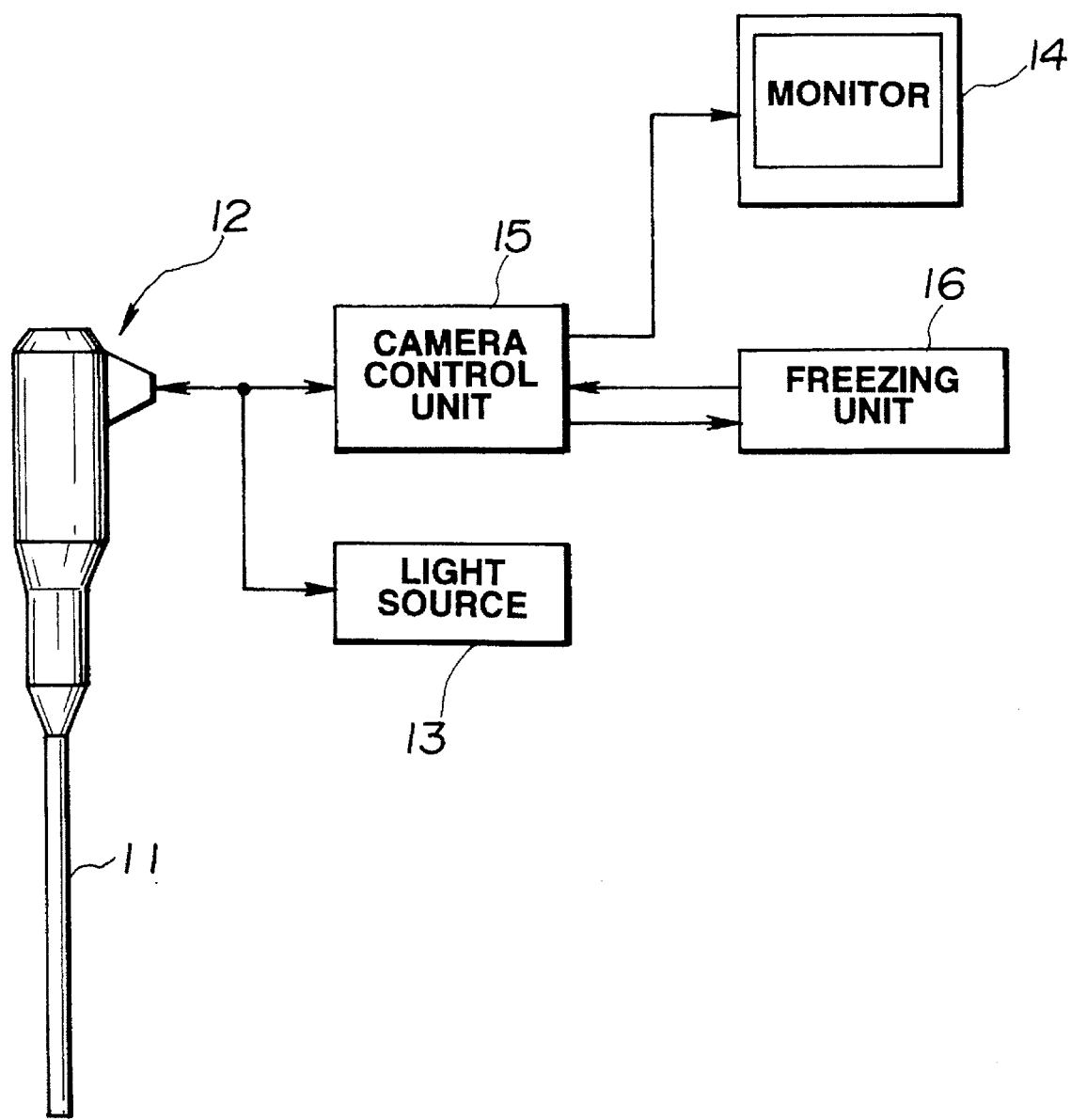
FIGS. 1 to 13 relate to the first embodiment of the present invention, where.

As shown in FIG. 1, an endoscope unit according to the first embodiment comprises a solid imaging element (not shown) at the tip of a long and narrow insertion part 11, an electronic endoscope 12 for imaging an object in lumen by, for example, a CCD, a light source 13 for supplying illumination light to the endoscope 12, a camera control unit 15 for signal-processing the imaging signal from the endoscope 12 to produce the image data, and then converting the image signal into, for example, the standard TV signal (NTSC signal or the like) to display it on a monitor 14, and a freezing unit 16 by which the image signal from the control unit 15 is input and then its color discrepancy is detected, and a still image is output with a freeze signal to the control unit 15.

Figure 2:
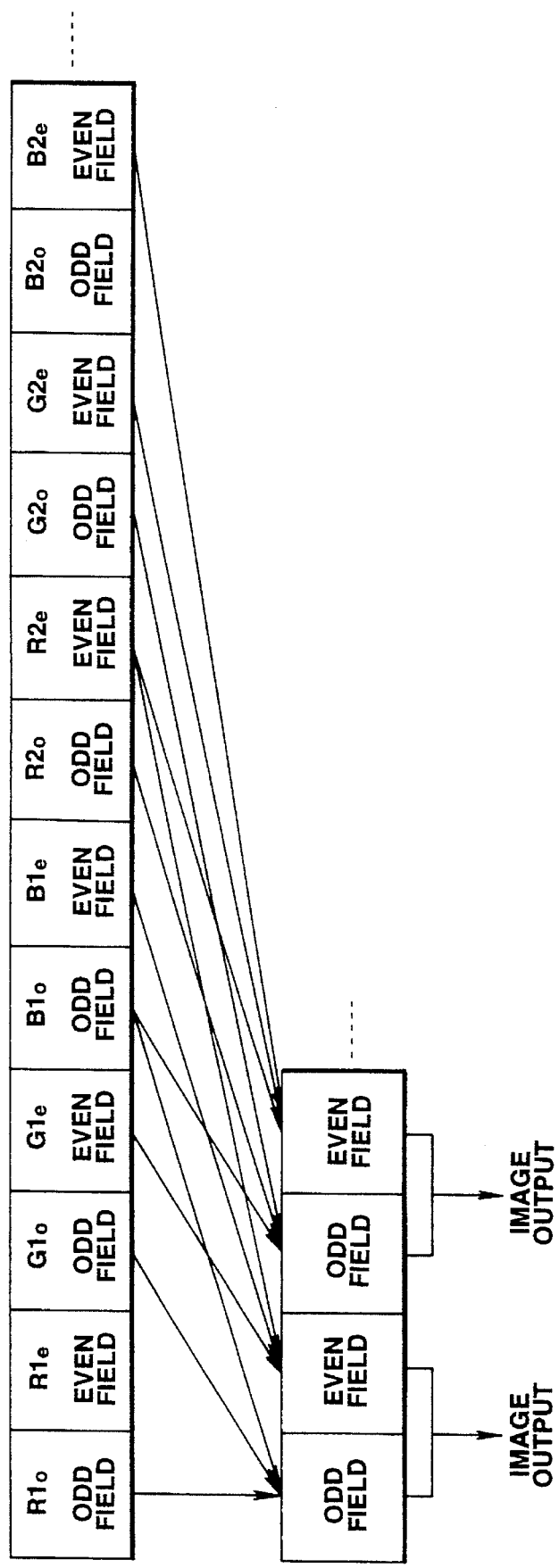

The production of a still image made from image data obtained from the imaging signal imaged by the electric endoscope 12, will be now described in connection with FIG. 2. In the present invention, the electric endoscope 12 obtains the imaging signal by irradiating the area sequential light of RGB onto an object. The image data obtained from the imaging signal, as shown in FIG. 2, are sequentially input into the camera control unit 15 in the form of R1 odd field data and R1 even field data, G1 odd field data and G1 even field data, B1 odd field data and B1 even field data, R2 odd field data and R2 even field data, G2 odd field data and G2 even field data, B2 odd field data and B2 even field data, . . . , as the first image data group. The camera control unit 15, thus, for example, produces the image data of an odd field from R1 odd field data, G1 odd field data and B1 odd field data, and the image data of an even field from G1 even field data, B1 even field data and R2 even field data, and then outputs one frame of color image with image data of both the odd field and the even field produced, respectively, on the monitor 14. Consequently, a smooth successive motion image is observable. However, when the still image at the freezing unit 16 is produced in such a manner as described above, color discrepancy occur on the part of the image, so in the present embodiment, the optimum still image can be obtained by a method to be described later.

Figure 3:
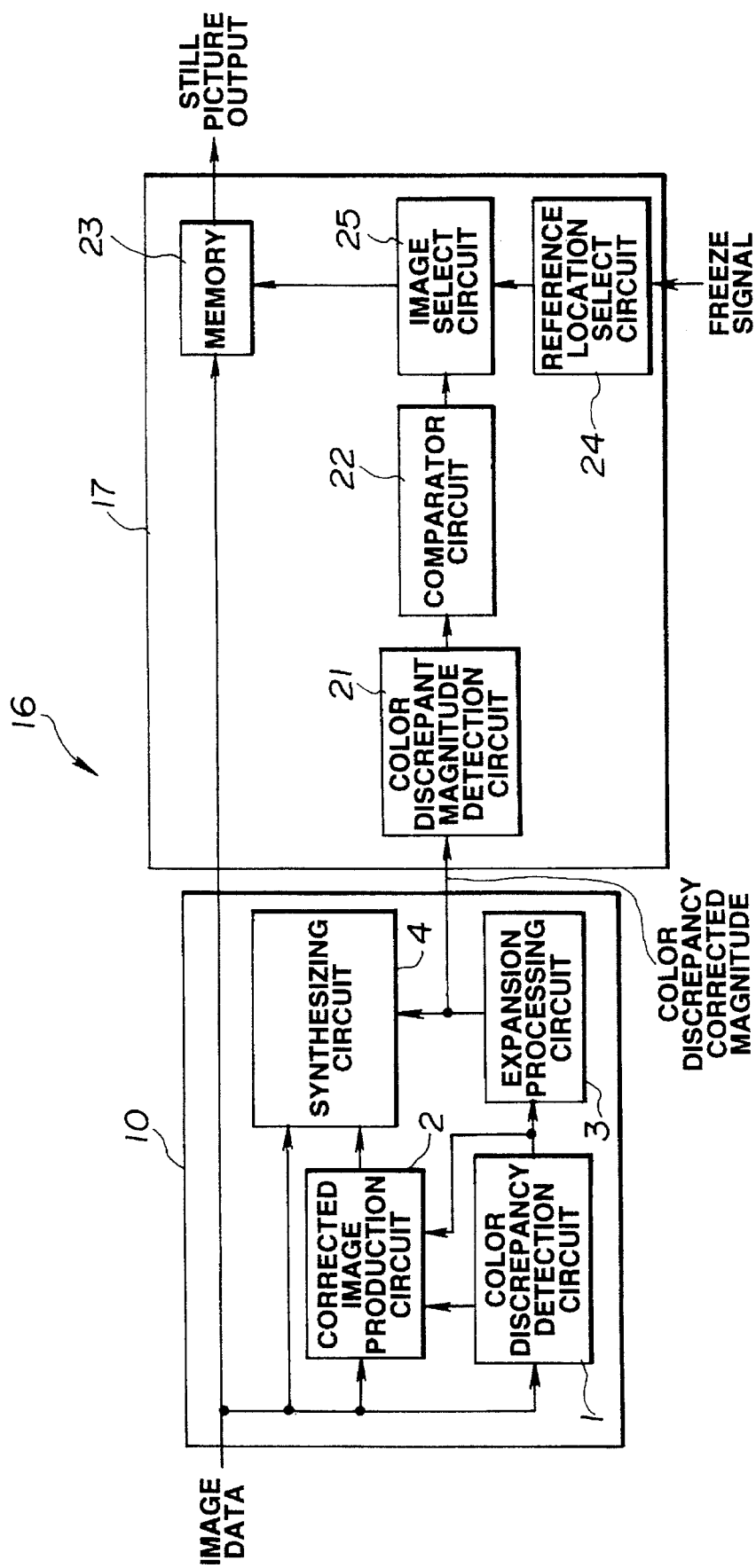

Namely, as shown in FIG. 3, the freezing unit 16 comprises a color discrepancy correction circuit 10 for detecting color discrepancy for each pixel of image data input and correcting the color discrepant image, a color discrepancy preventive freezing circuit 17 for producing a frozen image prevented from having color discrepancy based on a color discrepancy corrected magnitude detected by the freezing signal and color discrepancy correction circuit 10.

The color correction circuit 10 comprises a color discrepancy detection part 1 for detecting color discrepant pixels out of image signal input, a corrected image production part 2 for producing a corrected image, an expansion processing part 3 for expanding the color discrepant region detected at the color discrepancy detection part 1, a synthesizing part 4 for synthesizing the image data (original image) and the corrected image from the corrected image production part 2 in response to the synthesis ratio with the color discrepancy region expanded at the expansion processing part 3. The detailed configurations and operations of this color discrepancy correction circuit 10 are similar to the "color discrepancy correction unit" described in the specification of Japanese Patent Provisional Publication No. 327622/94, paragraph Nos. 0009–0046, and drawings FIG. 1 to 12, thus the description will be omitted.

The color discrepancy preventive circuit 17 comprises a color discrepant magnitude detection circuit 21 for accumulating from 54 to 230 lines in the screen, as described later, the color discrepancy corrected magnitude for each pixel output from the expansion processing part 3 of the color discrepancy correction circuit 10, and detecting it as the color discrepant magnitude for one field, a comparator circuit 22 including a line memory described later for storing the color discrepant magnitudes for 16 fields detected at the color discrepant magnitude detection circuit 21 and a comparator described later for comparing the color discrepant magnitudes for 16 fields and searching a field with the least color discrepancy, a memory 23 for storing 16 field images for each RGB color, a reference position selection circuit 24 for selecting a reference image position with the freezing signal, an image selection circuit 25 for selecting the address of the image of which the field has the least color discrepancy, with the outputs of the comparator circuit 22 and reference position selection circuit 24, and said memory 23 functions to output the image of an address selected by the image selection circuit 25.

Figure 4:
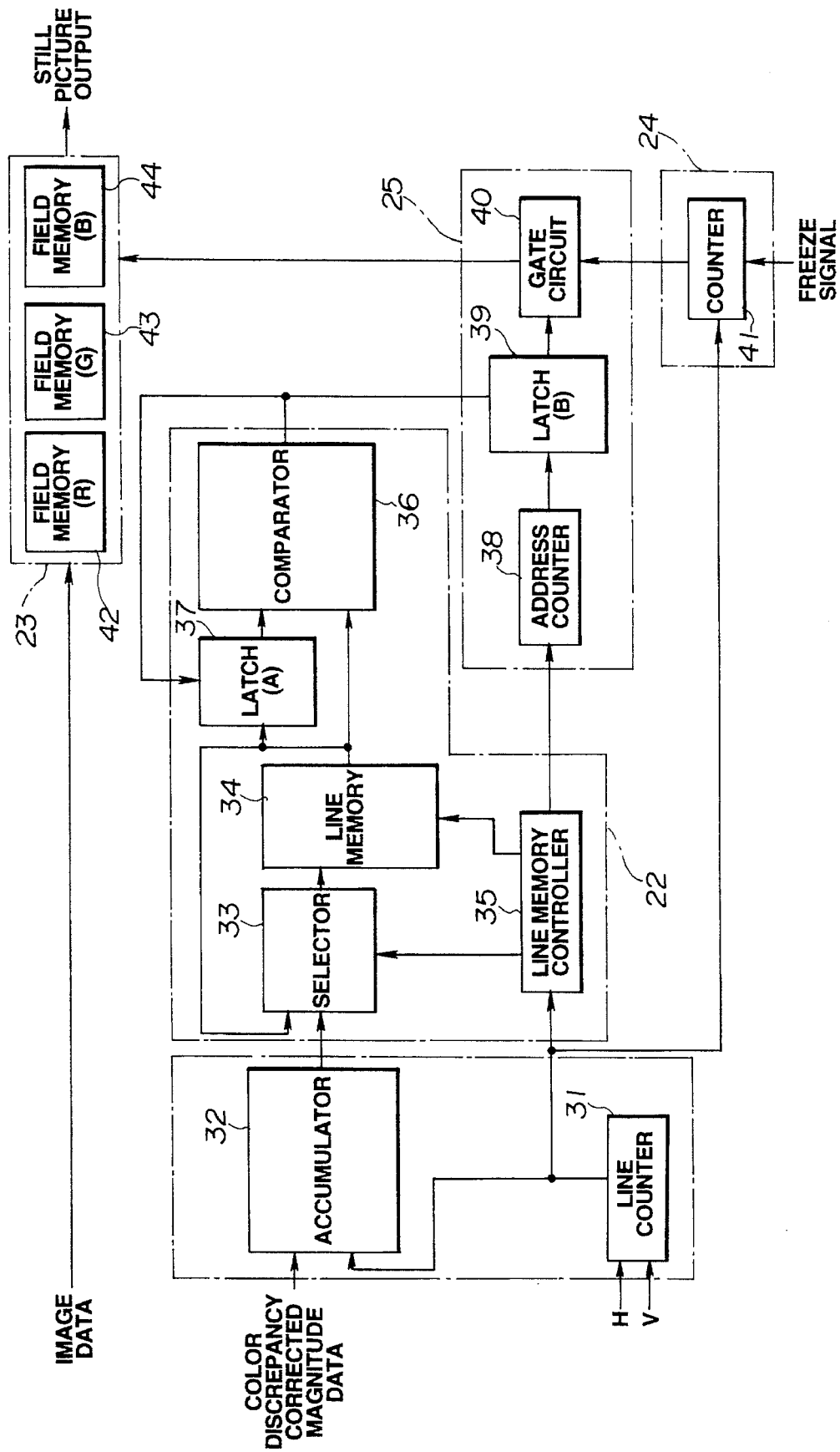
Figure 5:
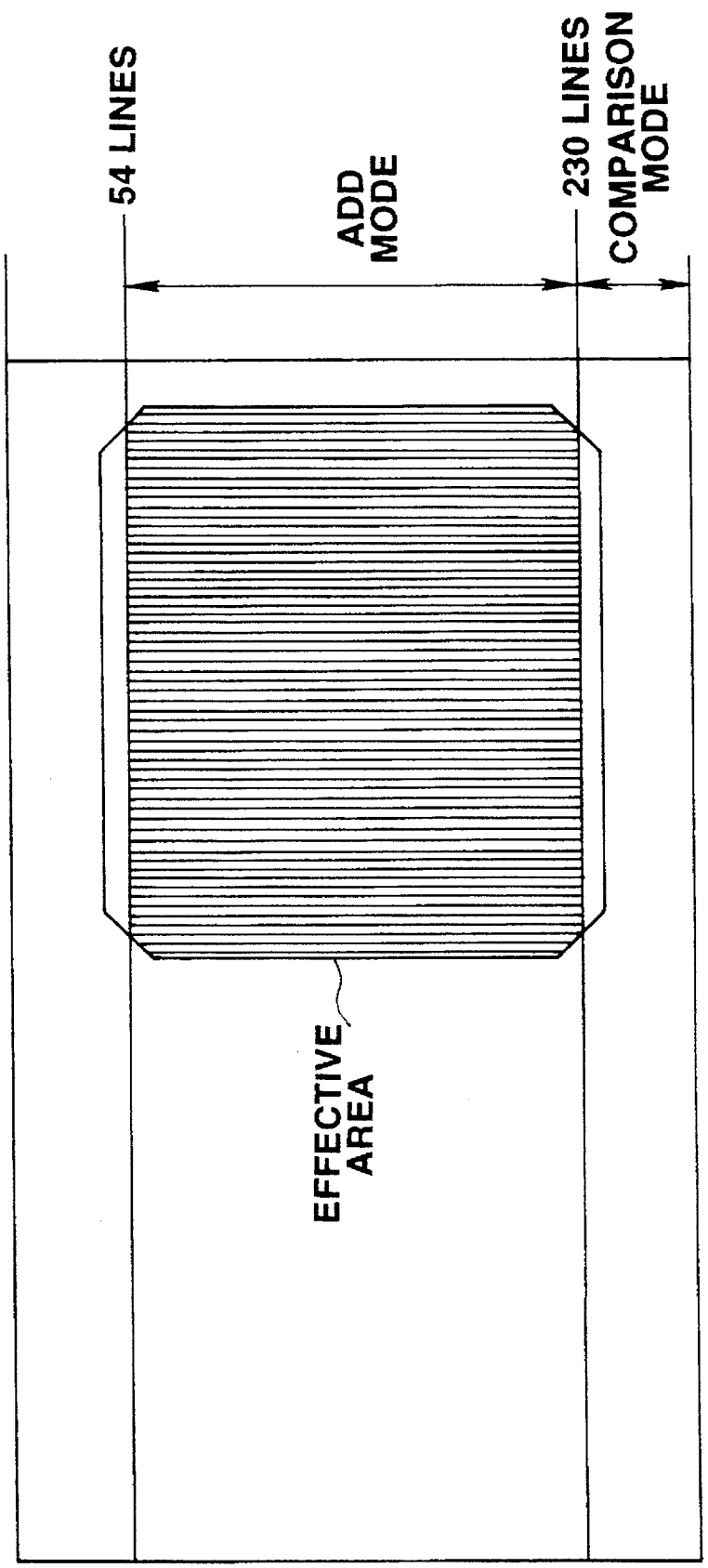

Referring to FIG. 4 illustrating the detailed configuration of the color discrepancy preventive freezing circuit 17, the color discrepant magnitude detection circuit 21 comprises a line counter 31 for counting the number of lines from 54 to 230 lines corresponding to the effective area in the virtual screen shown in FIG. 5, and switching between the add mode and the comparison mode, and an accumulator 32 for accumulating the color discrepancy corrected magnitude for each pixel during the add mode, and detecting the color discrepant magnitude for each field.

Further, the comparator circuit 22 comprises a line memory for storing the determined number of color discrepant magnitude data, i.e., for 16 fields in this embodiment, from the accumulator 32, a selector 33 for switching between the color discrepant magnitude data from the accumulator 32 and the color discrepant magnitude data stored in the line memory 34, a line memory controller 35 for controlling the line memory 34 and the selector 33, a comparator 36 (image detection means) for detecting the least value of the color discrepant magnitude, and a latch (A) for holding the lowest value of the color discrepant magnitude.

The image selection circuit 25 comprises an address counter 38 for counting the address of memory 23 in which an image with the lowest color discrepant magnitude is stored, a latch (B) 39 for holding the address, and a gate circuit 40 for allowing the address to output synchronously with the freezing signal to the memory.

The reference position selection circuit 24 comprises a counter 41 for delaying the freezing signal for the determined number of fields to output, and the memory 23 comprises fields memories (R) 42, (G) 43, (B) 44 for each RGB color.

Then, the operation of freezing unit 16 in the endoscope unit configured in such manner described above, will be now described.

Image data input from the camera control unit 15 are processed at the expansion part 3 of FIG. 3, in the color discrepancy correction circuit 10, and output as the color discrepancy corrected magnitude for each pixel to the color discrepant magnitude detection circuit 21. The corrected magnitudes are added by the accumulator 32 of FIG. 4 during the add mode controlled by the line counter 31 in the color discrepant magnitude detection circuit 21, and output as the color discrepant magnitude for each field to the comparator circuit 22. At the comparator circuit 22, this color discrepant magnitude is written into address 0 of the line memory 34. Then, write/read operation is repeated by the line memory controller 35, so as to shift data from address 0 to address 15 of the line memory 34 by one address, while each read-out color discrepant magnitude is sequentially compared at the comparator 36, and the lowest value of the color discrepant magnitude is detected, and held at the latch (A).

Figure 6:
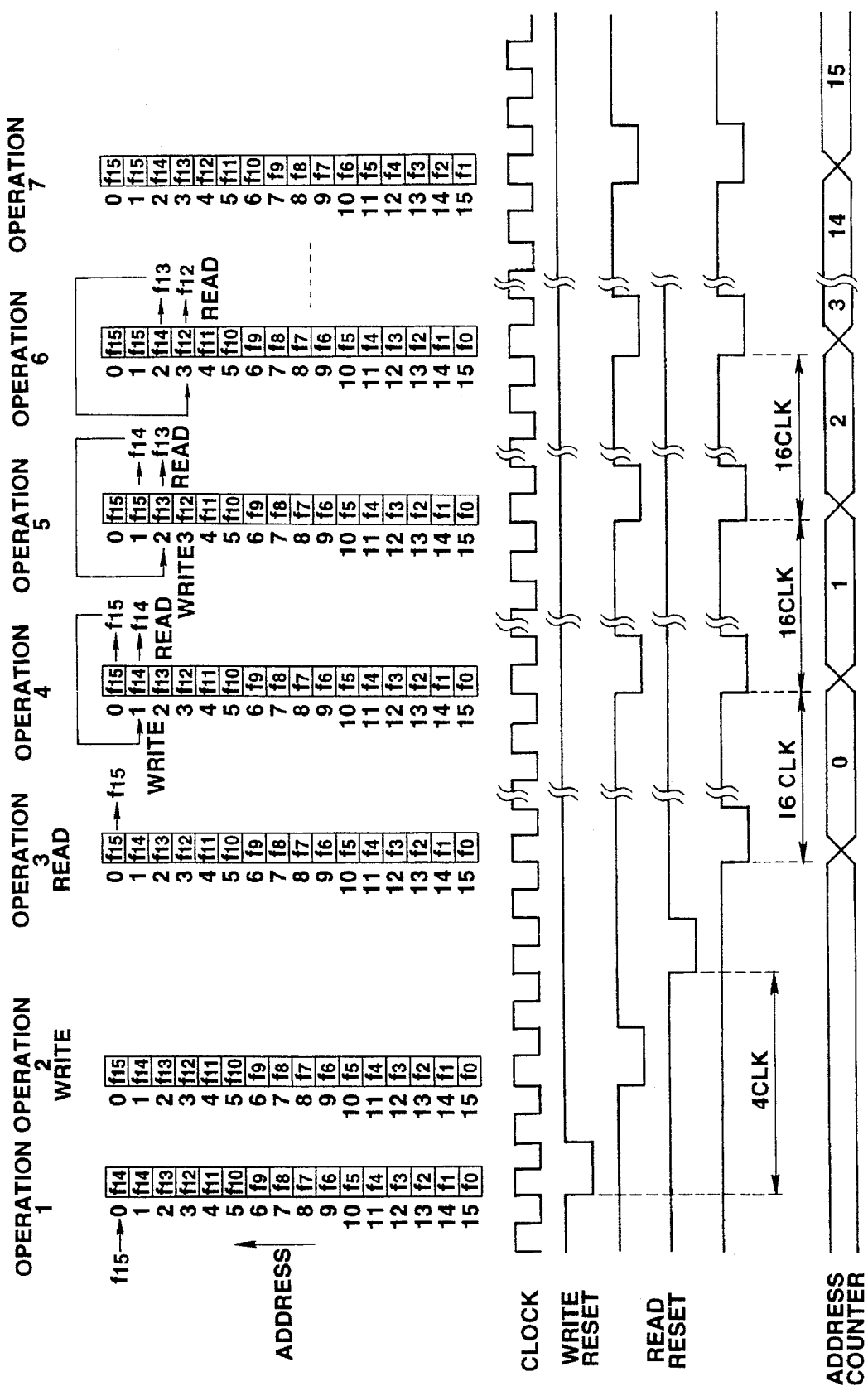

The operation of this color discrepancy preventive freezing circuit 16 will be now described by reference to FIG. 6.

Operation 1:

Write reset by the line memory controller 35 operates one clock later from the clock timing after accumulation of the effective area for each image is completed in add mode.

Operation 2:

The color discrepant magnitude f15 is written into the address 0 of the present line memory 34 in operation 1 by a write signal at two clocks later than the write reset.

Operation 3:

Read reset operates at four clocks later than the write reset. The color discrepant magnitude f15 at the address 0 is read out at two clocks later than that by the read signal. Then, it is in a comparison mode at one clock later, the address counter 38 is set to the initial value "0", or the latch (A) 37 is set to the maximum value of the initial value, and then the color discrepant magnitude f15 of the value previously read at the address 0 is compared by the comparator 36. Then, the color discrepant magnitude to be compared with f15 is the maximum value, and the color discrepant magnitude f15 at the address 0 smaller than the maximum value is necessarily selected and held at the latch (A) 37. At the same time, the value ("0" in this case) at the address counter 38 is held at the latch (B) 39.

Operation 4:

Write and read operate simultaneously at a predetermined interval from this read, at sixteen clocks in this case, the color discrepant magnitude f14 of the value of the address 1 is read, the color discrepant magnitude f15 of the value previously read is fed back to the line memory 34 through the selector 33, and written into the address 1. The color discrepant magnitude f14 read at the address 1 and the data of the latch (A) 37 (the color discrepant magnitude f15 at the previous address 0 in this case) are compared by the comparator 36, and if the color discrepant magnitude f14 at the address 1 is smaller than the data, then the value of the color discrepant magnitude f14 is held at the latch (A) 37. At the same time, the address counter B8 operates to count up the addresses, and the present address to be compared (the address 1 in this case) is held at the latch (B) 39. On the other hand, if the value of the color discrepant magnitude f14 is greater than the data, then the data at the latch (A) 37 and latch (B) 39 are held unchanged.

Operation 5:

The color discrepant magnitude f13 at the address 2 is read out in the next write/read operation, the color discrepant magnitude f14 is written into the address 2.

Operation 6:

A series of operations similar to said operation 4 are repeated.

Operation 7:

The series of operations described above are repeated for the color discrepant magnitudes for 16 fields from the address 0 to 15, and an address with the least value of color discrepant magnitude is selected.

The add mode and the comparison mode are repeated for each field. When the freezing signal is input, it is delayed for a determined time by the counter 41 of the reference position selection circuit 24, and output to the gate circuit 40 of the image selection circuit 25.

Figures 7, 8, 9:
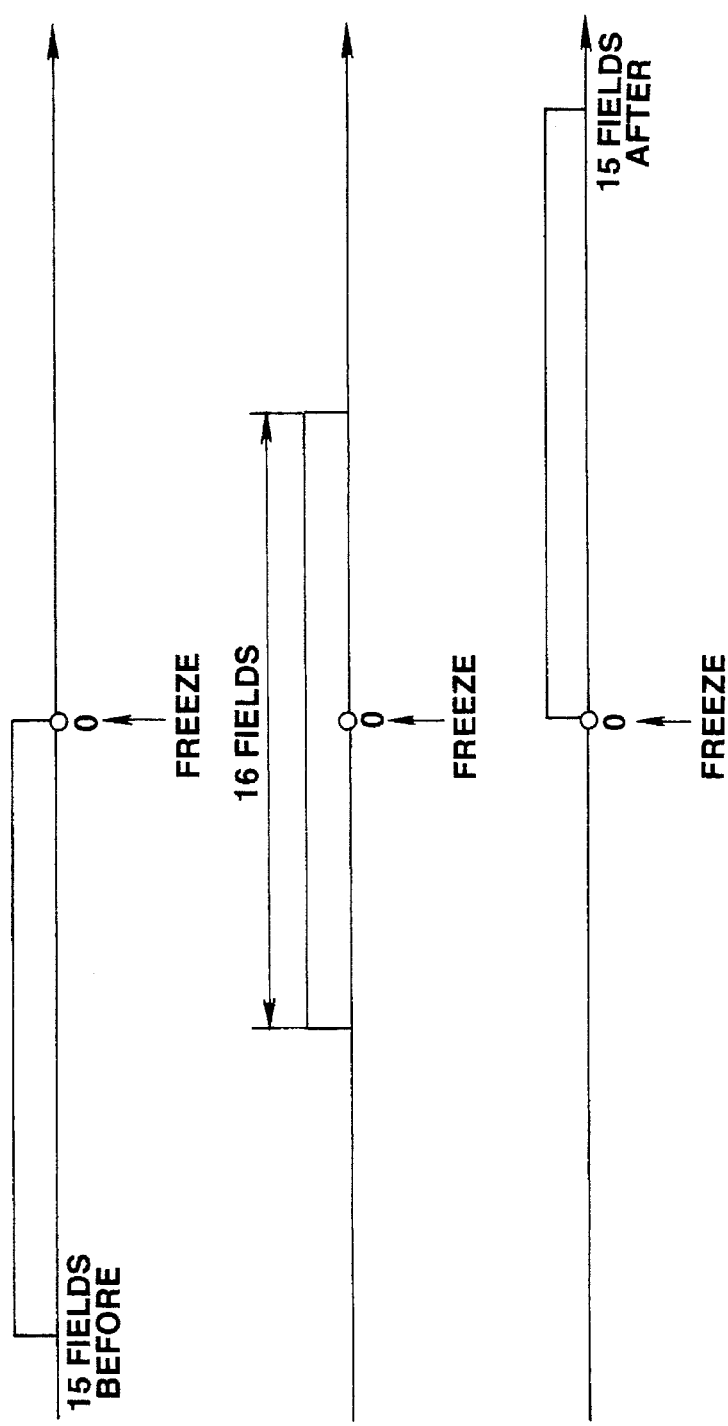

Here, a reference position for which the operator's response time with the reference position selection circuit 24 is considered, selections of the object position for comparison operation are shown in FIGS. 7 to 9 by way of example. This object position can be selected by an operator. FIG. 7 illustrates the selection of the object position to output an optimum image in consideration of human's response time, in this example, an image when the freeze command is executed is assumed as "0", a field with the least color discrepancy among 16 fields up to 15 fields before (about 0.25 sec.) is detected.

FIG. 8 illustrates the selection of the object position to output an optimum image in the neighborhood of where the freeze command is executed, in this example, a field with the least color discrepancy among images for sixteen fields in total lying with "0" as the center, is detected.

FIG. 9 illustrates the selection of the object position to associate with the conventional color discrepancy preventive freezing, in this example, a field with the least color discrepancy among sixteen fields from "0" to fifteen fields after is detected.

When the freezing signal is input from the reference position selection circuit 24, the address held at the latch (B) 39 is output to the memory 23 through the gate circuit 40, and the image stored at this address is output.

The operation of the memory 23 will be now described by reference to FIG. 10.

Figure 10:
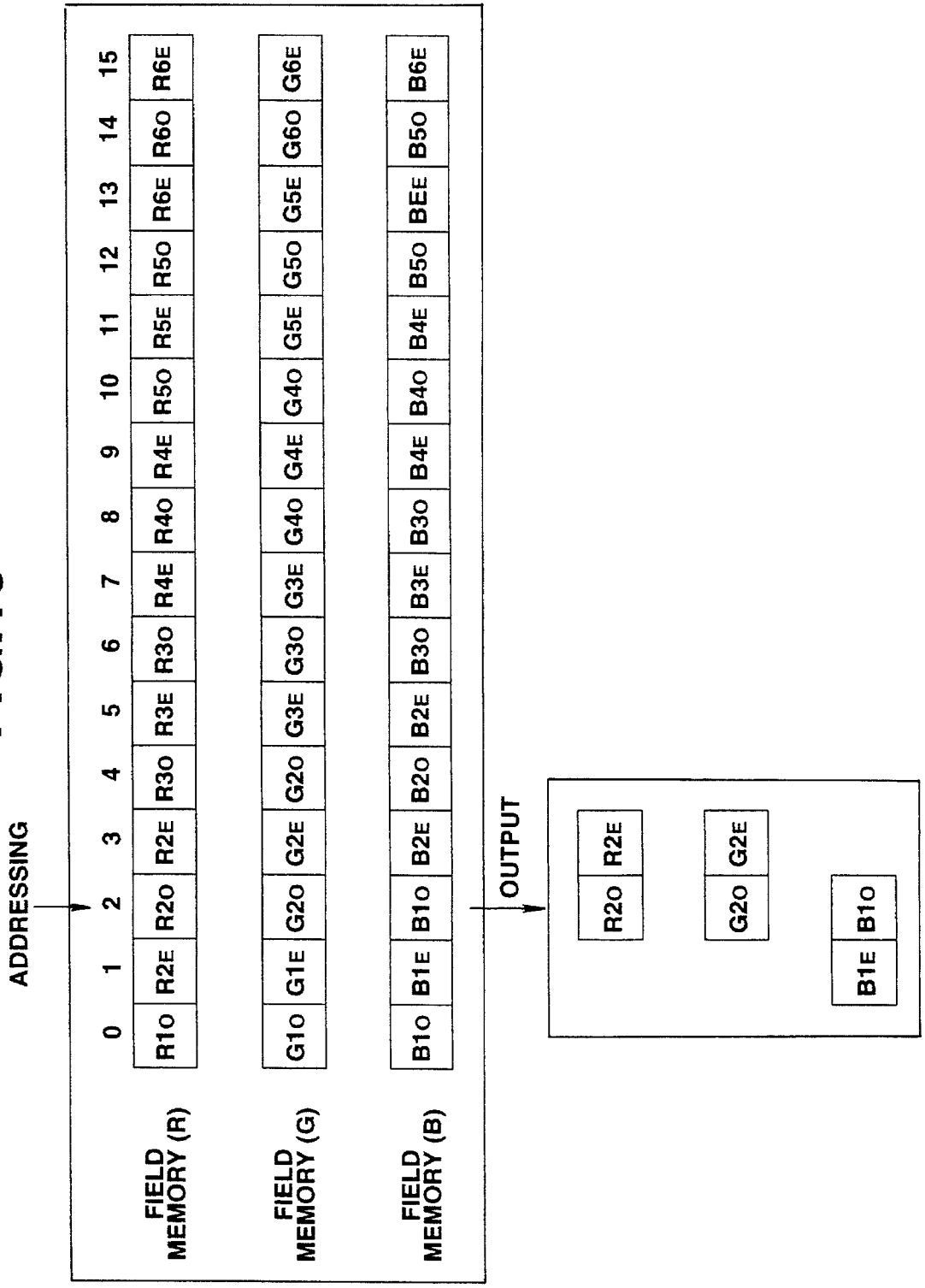

The input image, as shown in FIG. 10, is written into the field memories (R) 42, (G) 43 and (B) 44 of the memory 23 for each RGB color. For example, when the field of address 2 is specified as the least color discrepant value, then the output of the memory 23 outputs the image of the same frame including the field specified. Such output system is employed, so that an image with the least color discrepancy and without flicker is output.

According to the freezing unit 16 of the present embodiment, the image data for sixteen fields are stored in the memory 23, and the color discrepant magnitude for sixteen fields corresponding to the image data stored in the memory 23 is stored in the line memory 34, and the address of field image data having the least color discrepant magnitude out of the color discrepant magnitudes for sixteen fields stored in the line memory 34 is detected/held by the latch (A) 37, the comparator 36 and latch (B) 39. Thus, the freeze command is executed, and at the object position in the comparison operation of the least color discrepant field when the freezing signal is input, the field image data with the least color discrepancy among the field image data for sixteen fields stored in the memory 23 are read out from the memory 23 and output as a still image, so as to regularly detect the least color discrepant image. Namely, while images being shot at present are recorded in a memory with the predetermined number of fields, the color discrepant magnitudes for the determined number of fields are compared for each field and the least color discrepant image is detected at any time, thereby when the freeze command is executed, the least color discrepant image based on the position specified by the reference position selection circuit 24 without time lag can be obtained as a still image. An operator can select a reference position by the reference position selection circuit 24 in consideration of his response time, thereby the least color discrepant image is also detected at any time during shooting, such that the least color discrepant image for which a time difference caused by the human's response time is considered, can be obtained.

The comparator circuit 22 was provided with the line memory 34 for storing the predetermined number of color discrepant magnitude data, for sixteen fields in this case, from the accumulator 32, although, it is not limited to this. For example, it may be configured in that a storage means for storing the color discrepant magnitude data from the accumulator 32 is provided, such that the color discrepant magnitude stored in the storage means is compared with the color discrepant magnitude data to be calculated in the next place from the accumulator 32, and its small one is stored in the storage means to update the means.

The configuration shown of the color discrepancy correction circuit is not limited to the configuration in FIG. 3. The modified embodiment of the color discrepancy correction circuit applicable to the present invention will now be described below.

Figure 11:
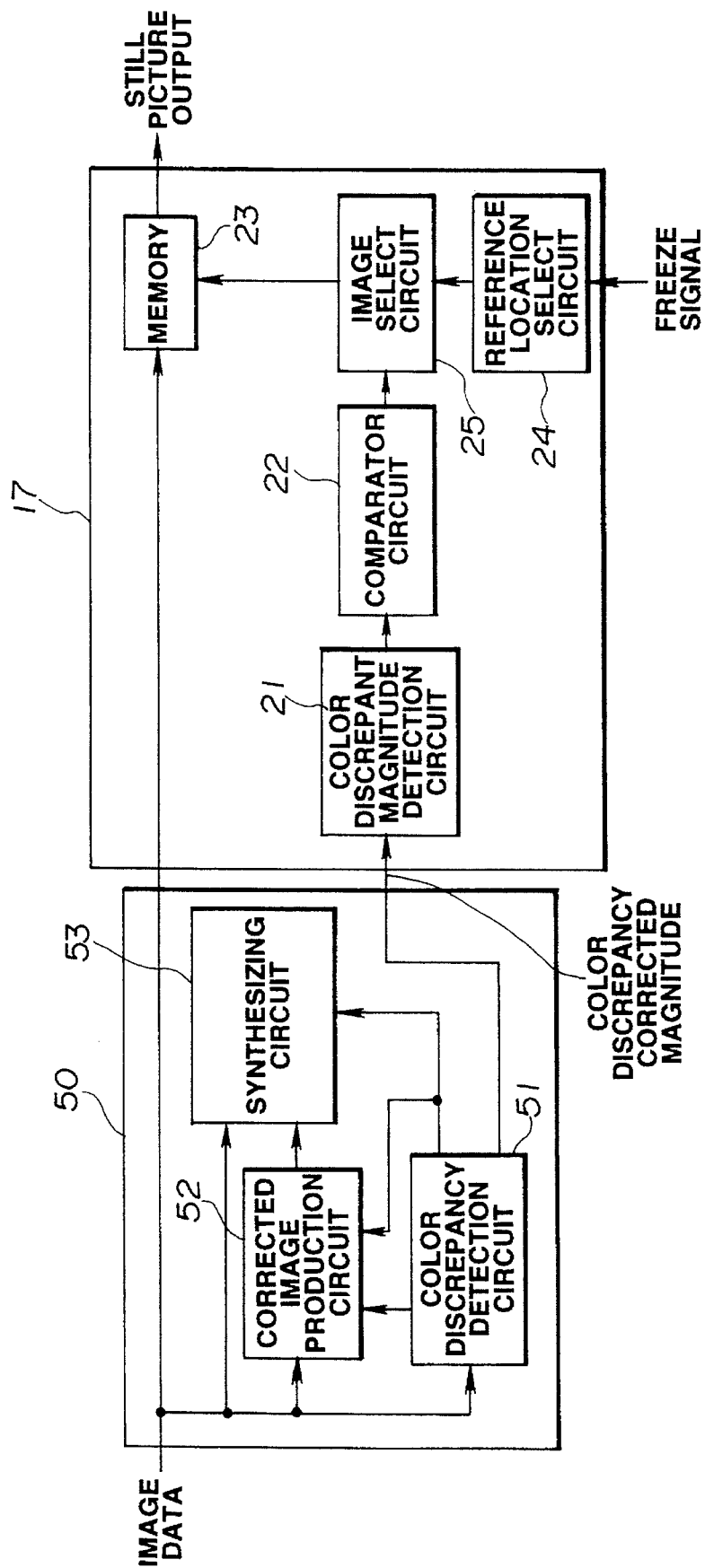

As shown in FIG. 11, a color discrepancy correction circuit 50 in the modified embodiment comprises a color discrepancy detection part 51 for detecting a color discrepant pixel from image data (original image) to be input, a corrected image production part 52 for producing a corrected image from the image data (original image), and a synthesizing part for synthesizing the image data (original image) and the corrected image at a synthesized ratio changed in response to the color discrepancy at the color discrepancy detection part 51.

Figure 12:
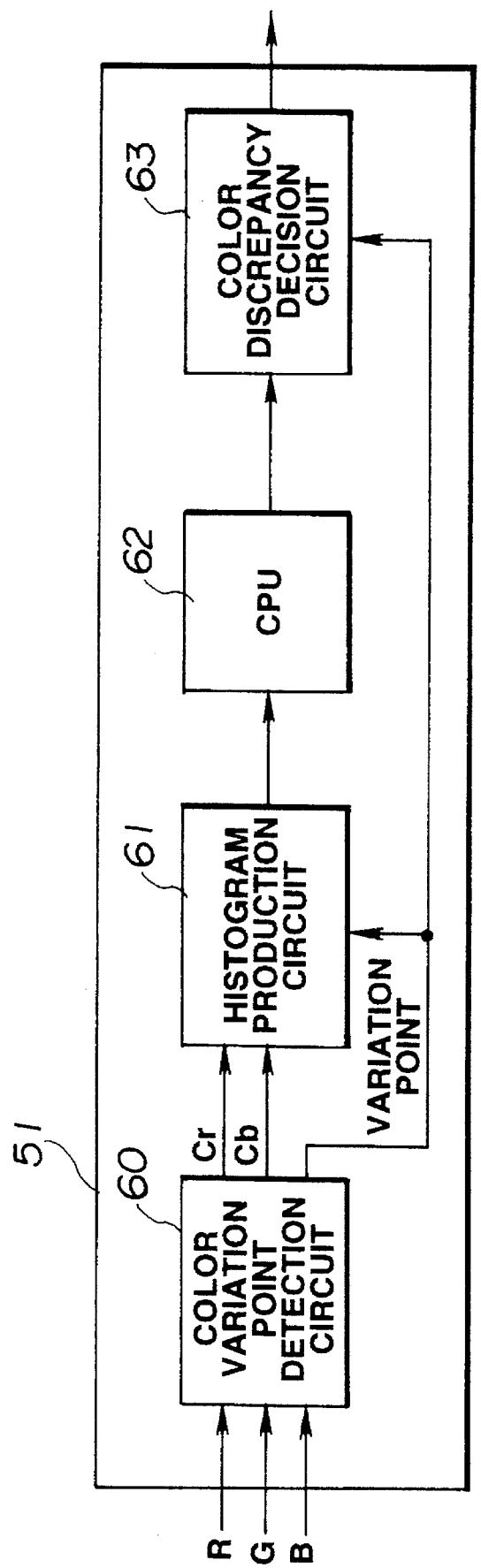

The configuration of the color discrepancy detection part 51 is shown in FIG. 12. The detection part 51 has a color variation point detection circuit 60 for detecting pixels with variation in color for each R, G and B image, for example, imaged by the electronic endoscope 12, and a histogram production circuit 61 for producing a color plane histogram for each field, on the basis of the result of this detection circuit 60. Further, the color discrepancy detection part 51 has a CPU block 62 and a color discrepancy decision circuit 63. The CPU block 62 functions to calculate the histogram data from said histogram production circuit 61. The color discrepancy decision circuit 63 retrieves the color distribution signal calculated at said CPU block, and decides the degree of color discrepancy, on the basis of the detected result of said color variation point detection circuit 60.

Figure 13:
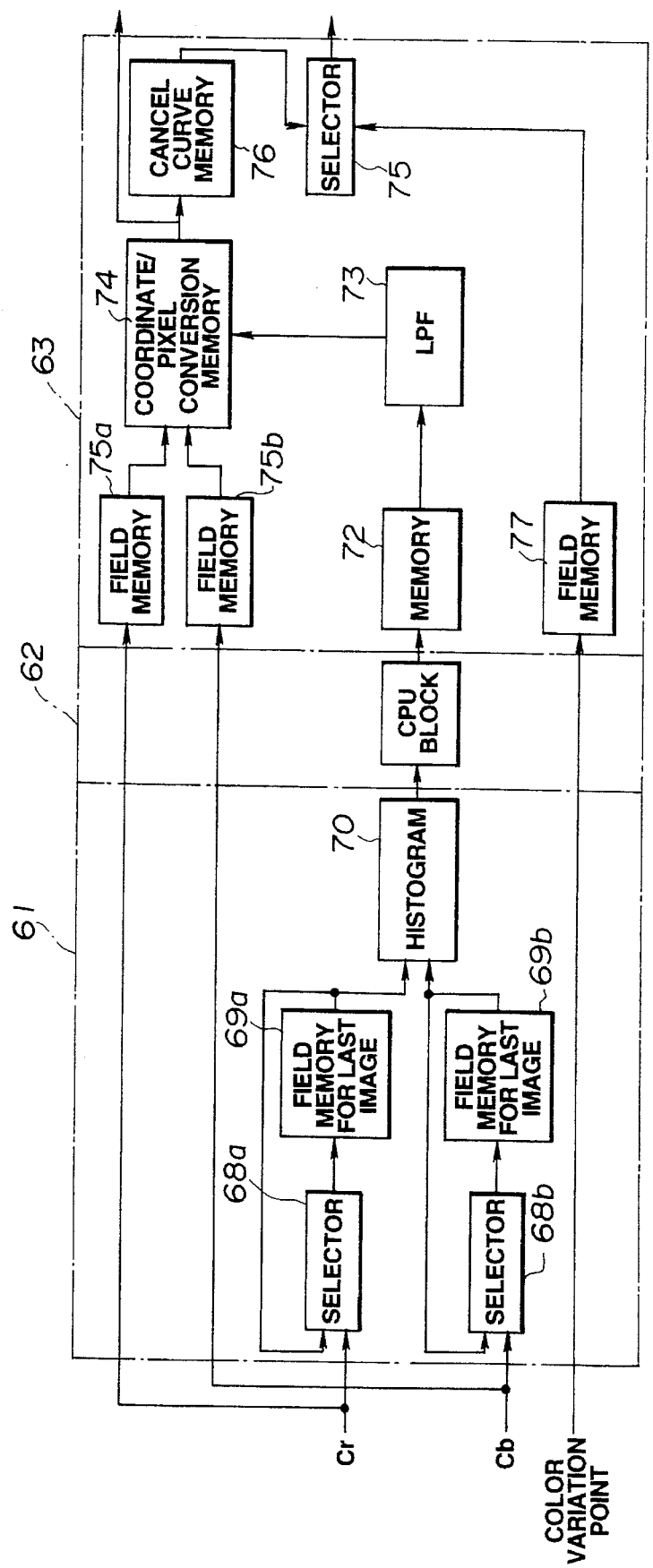

FIG. 13 illustrates the configuration of the histogram production circuit 61, CPU block 62 and the color discrepancy decision circuit 63.

The histogram production circuit 61 comprises selectors 68a, 68b for selecting Cr, Cb signals calculated by the color variation point detection circuit 60 and color signal data read out from field memories for the last image 69a, 69b, and the field memories for the last image 69a, 69b for storing color signals for each field selected by the selectors 68a, 68b, and a histogram LSI 70 for producing a color distribution from the color signals for each field stored in the field memories for the last image 69a, 69b. The CPU block 62 functions to normalize the histogram produced by the histogram LSI 70.

The color discrepancy decision circuit 63 comprises a memory 72 for storing the color plane data normalized at CPU block 62, a low-pass filter (hereinafter referred as LPF) for smoothing the color plane recorded in the memory 72, a coordinate/the number of pixels conversion memory 74 for storing the color signal smoothed by LPF 73, field memories 75a, 75b for delaying for one field time Cr, Cb signals calculated by the color variation point detection circuit 60, a cancel curve memory 76 for obtaining the number of pixels by the coordinate/the number of pixels conversion memory 74 from the color signal delayed in the field memories 75a, 75b, and retrieving the degree of color discrepancy from the number of pixels, a field memory 77 for delaying the output of the color variation point detection circuit 60 for one field time, and a selector 78 for selecting the degree of color discrepancy at the part of the color variation point. In said configuration, the color variation point detection circuit 60 converts digital R, G and B signals into color signals Cr, Cb, to compare color signals having a time difference of four fields therebetween. Generally, R-Y, B-Y are used as the color signals, though, consist of nine bits when calculated with eight bits for each R, G and B. Signals produced by processing nine bits into eight bits width are Cr, Cb. These two signals Cr, Cb are delayed for four fields, then subtraction is carried out between the signals Cr, Cb with four-field delay and the signal Cr, Cb without delay, and if the result is positive, then positive side comparison is carried out. On the other hand, the result is negative, negative side comparison is carried out. It is compared with the respective determined value to decide the variation in color. The histogram production circuit 61 comprises the selectors 68a, 68b, the field memories 69a, 69b, and the histogram LSI 70, as described above, in order to produce the histogram of color plane from the pixel data of image for each field without color discrepancy.

In order to store the image for each field without color discrepancy, each pixel is input into the field memories 69a, 69b through the selectors 68a, 68b for selecting only pixels without variation in color. The histogram of Cr, Cb color planes is produced from the image for each field without color discrepancy stored in the field memories 69a, 69b. The field memories 69a, 69b storing the pixel data of images for each field without color discrepancy erase the content when read out due to its FIFO structure, so the content is feed-backed to the selectors 68a, 68b, and the pixels without color discrepancy are accumulated and stored.

In the CPU block 62, in order to produce a coordinate/the number of pixels conversion table, the color distribution state of the color plane obtained from the image for each field is read out from the histogram LSI 70 as sixteen bit data, and if it is greater than the predetermined value, then an upper limit process is performed to set to the determined value, and the least bit is deleted to make it eight bit data, and the data are written into the memory 72.

In the color discrepancy decision part 63, the color plane of the histogram is smoothed, so it is not easy to identify the difference in color by the naked eye, since the coordinates adjacent each other in the color plane on the smoothed part thereof have similar colors. Further, in order to minimize the variation in the number of pixels between adjacent coordinates of the histogram data, in the color discrepancy decision part 63, the color distribution is smoothed through the expansion of color plane and LPF. Therefore, 16×16 color plane data written into the memory 72 at the memory 72 and LPF part 73, are assumed as 64×64 color plane, and read out, and then the color plane is processed by a spatial filter, and written into the coordinate/the number of pixels conversion memory 74.

The color signals Cr, Cb takes the histogram for one field, and requires a process time for one field to calculate them in CPU, so the signals are delayed for one field at the field memories 75a, 75b, input into the address of the coordinate/the number of pixels conversion memory 74, and output as the data of the number of pixels grouped into a package of eight bits.

The cancel curve memory 76 records the degree of color discrepancy corresponding to the number of pixels, and inputs the data of the number of pixels into the address to output the degree of color discrepancy.

The degree of color discrepancy is recorded in a range of "0" to 255 tones, where "0" represent no color discrepancy, the selector 78 is to output the degree of color discrepancy with pixels having variation, decided from the output of the variation point detection circuit 69, and the output of the selector 78 for pixels having no variation, is "0", i.e., no color discrepancy.

The variation point data are input into the selector 78 through the field memory 77 by the same reason as the color signals.

The configurations and operations described above employ the pixel distribution of the color histogram out of pixels with variation, so it is possible to detect only color discrepant pixels.

The detailed configuration and operation about this color discrepancy correction circuit 50 is similar to "color discrepancy correction unit" described in the specification of the Japanese Patent Provisional Publication No. 327620/94, paragraph Nos. 0011–0034, and FIG. 1 to 5, thus the description is omitted.

Referring again to FIG. 11, the image data input are processed at the color discrepancy detection part 51 in the color discrepancy correction circuit 50, and input into the color discrepant magnitude detection circuit 21 of the color discrepancy preventive circuit 17 as the color discrepancy corrected magnitude for one pixel from the coordinate/the number of pixels conversion memory 74.

The use of the color discrepancy correction circuit in such a modified embodiment allows a reduction in the circuit scale, since any component such as the expansion processing circuit is not required.

The second embodiment will be now described. The second embodiment is almost the same as the first embodiment, but the configuration of the color discrepancy correction circuit, so only different configurations are described, and like configurations denote like reference characters, and the description is omitted.

Figure 14:
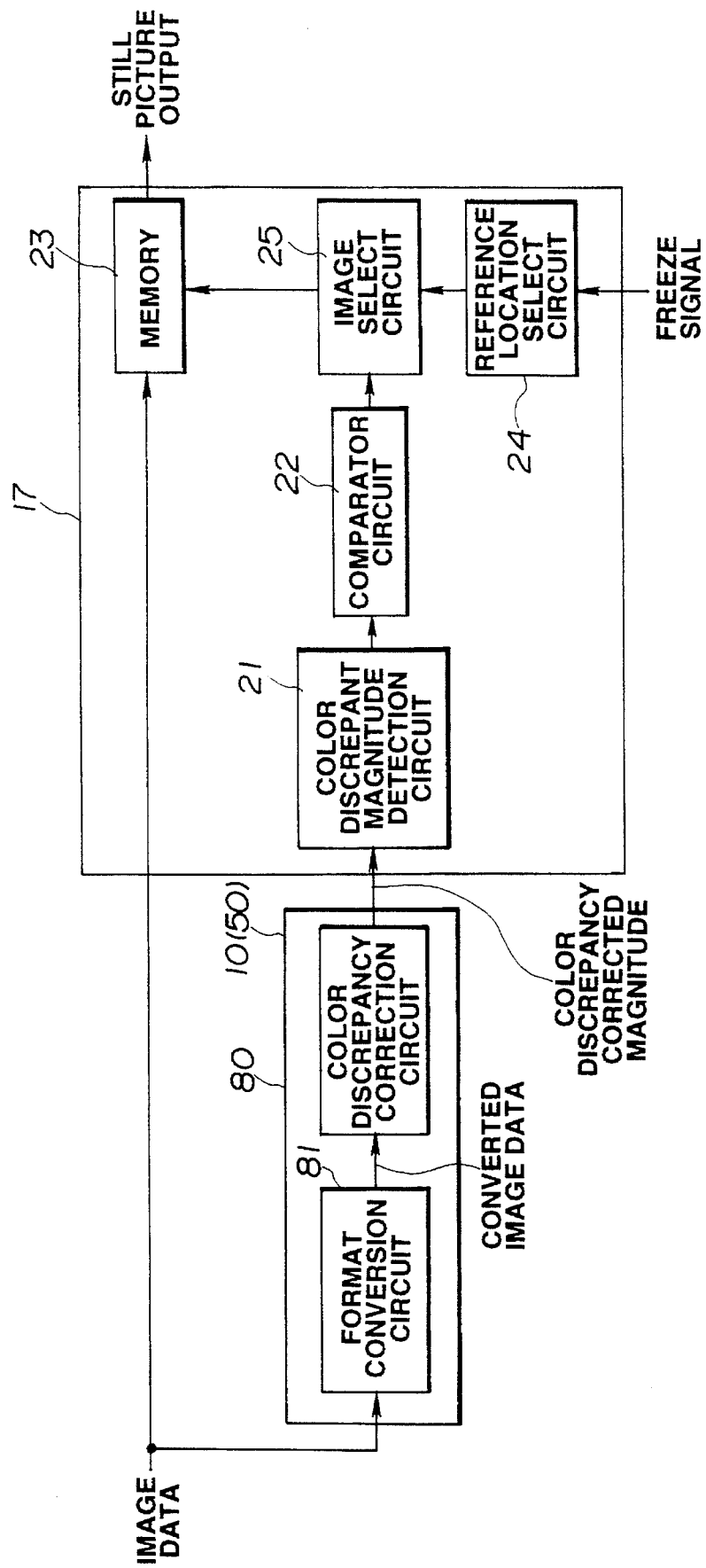
FIGS. 14 to 16, relate to the second embodiment, where.

In the freezing unit in the second embodiment, as shown in FIG. 14, the color discrepancy correction circuit 80 comprises a format conversion circuit 81 for arranging one frame image input, at a present field and a previous field in the virtual screen, and the color discrepancy correction circuit 10. Other configurations are the same as in the first embodiment. The color discrepancy correction circuit 50 in the modified embodiment may be employed instead of the correction circuit 10.

The operation of the freezing unit configured in such a manner will be now described.

The image input is output into the color discrepancy correction circuit 10 as the converted image data by the format conversion circuit 81.

Figure 15:
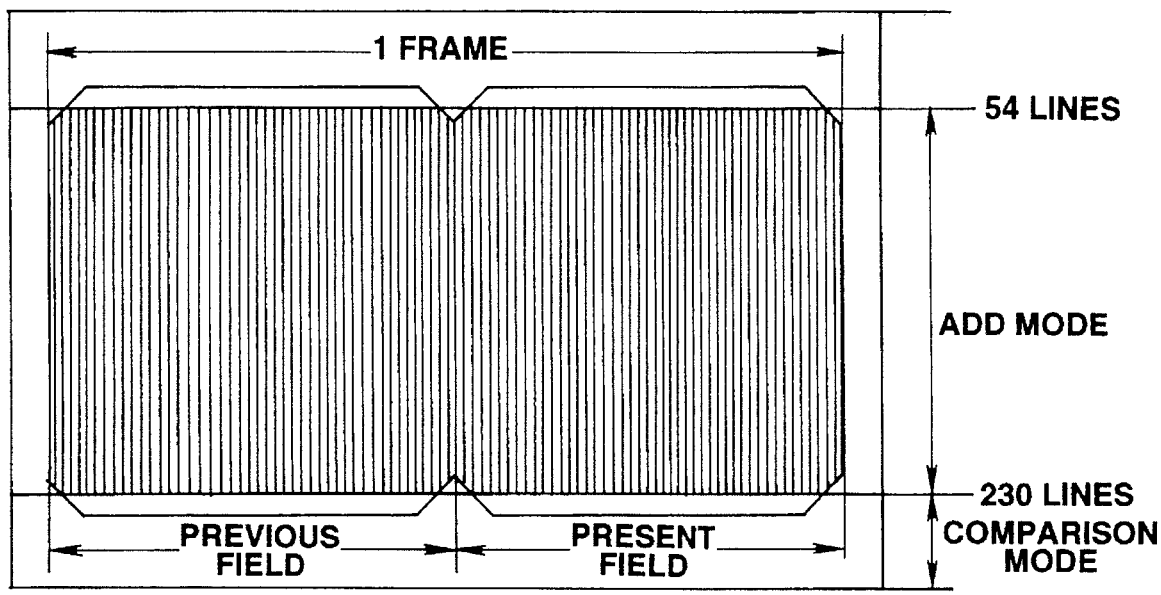

The format conversion by the format conversion circuit 81 will be described by reference to FIG. 15 and 16. As shown in FIG. 15, on the virtual screen of the color discrepancy correction circuit 10, the image of the previous field is output on the left screen, and the image of the present field is output on the right screen.

Figure 16:
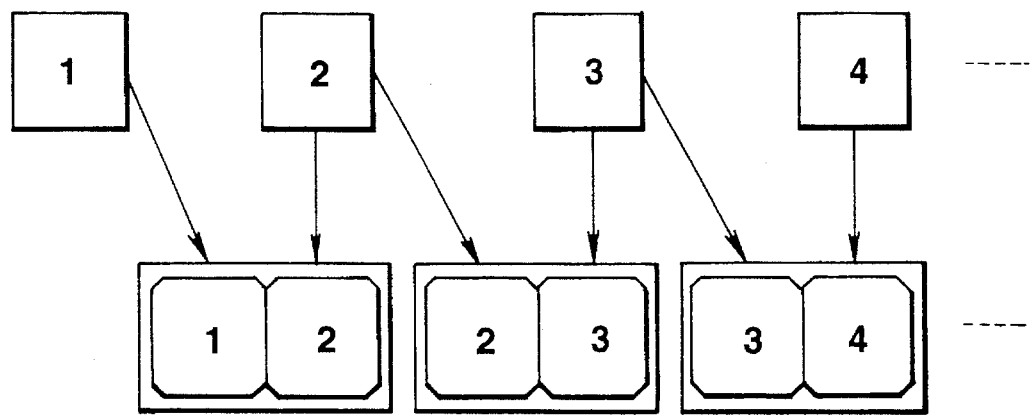

As shown in FIG. 16:

Operation 1: When the field image 2 is read in field unit, the field image 1 becomes the previous field image, then it is output on the left side of the screen, and the field image 2 becomes the present field image, then it is output on the right, so one frame image is formed by these two field images.

Operation 2: Then, when the field image 3 is read, the field image 2 becomes the previous field image, and then it is output on the left side of the screen, and the field image 3 becomes the present field image, and is then output on the right.

The operations described above are repeated. This converted image data is detected as the color corrected magnitude for each pixel by the color discrepancy correction circuit 10, and output into the color discrepant magnitude detection circuit 21 of the color discrepancy preventive circuit 17. Other operations are the same as in the first embodiment. According to the freezing unit of the second embodiment, in addition to the effect of the first embodiment, it is possible to detect the color discrepant magnitude for each frame by the format conversion circuit 81, so there is an effect in that the more precise image with the least color discrepancy can be obtained.

The third embodiment will be now described. The third embodiment is almost the same as the first embodiment, so like configurations denote like reference characters, and the description is omitted. The first and second embodiments are the embodiments of the freezing unit obtaining a still image without color discrepancy, while the third embodiment is an embodiment of the freezing unit obtaining a still image without blurred image.

Figure 17:
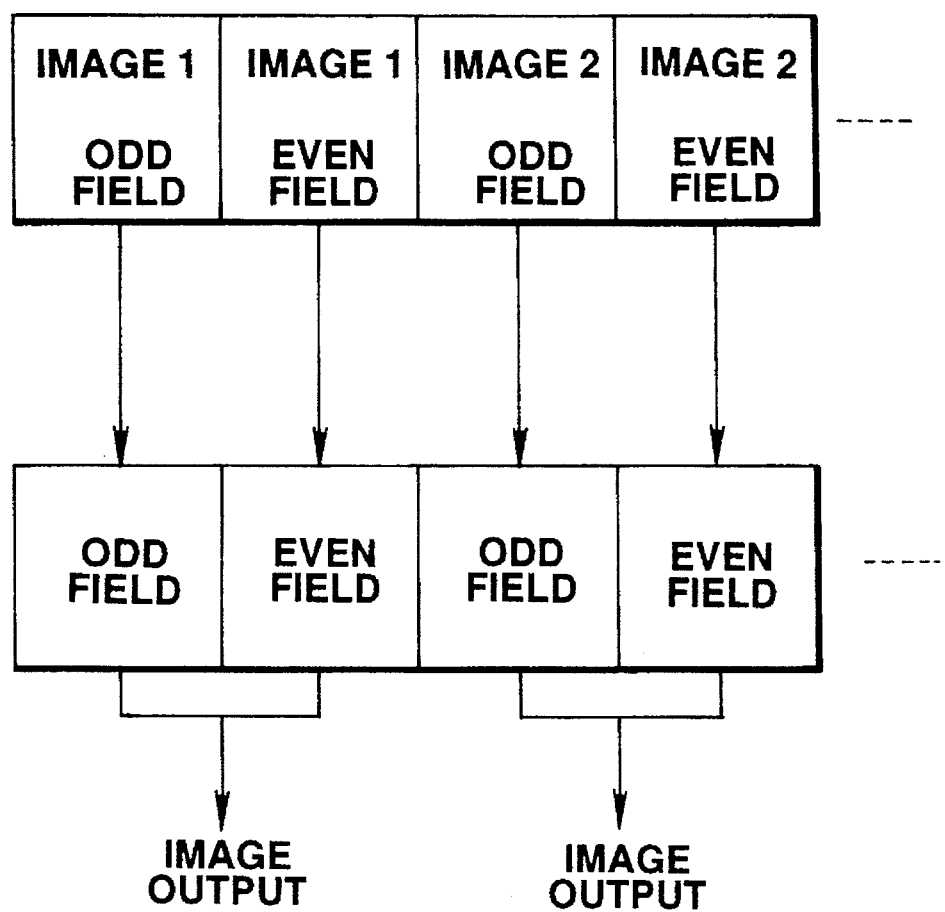
FIGS. 17 to 20, relate to the third embodiment, where.

The electronic endoscope in the third embodiment produces an image by the imaging signal obtained by imaging image data in simultaneous system (e.g., CCD with color filter on its image surface). In this case, as shown in FIG. 17, the image data outputs the image from the odd field data and even field data of the first image. When a still image by the freezing unit is produced in such manner as described above, it may have a blurred image, so in the present embodiment, an optimum still image can be obtained in the manner described later.

Figure 18:
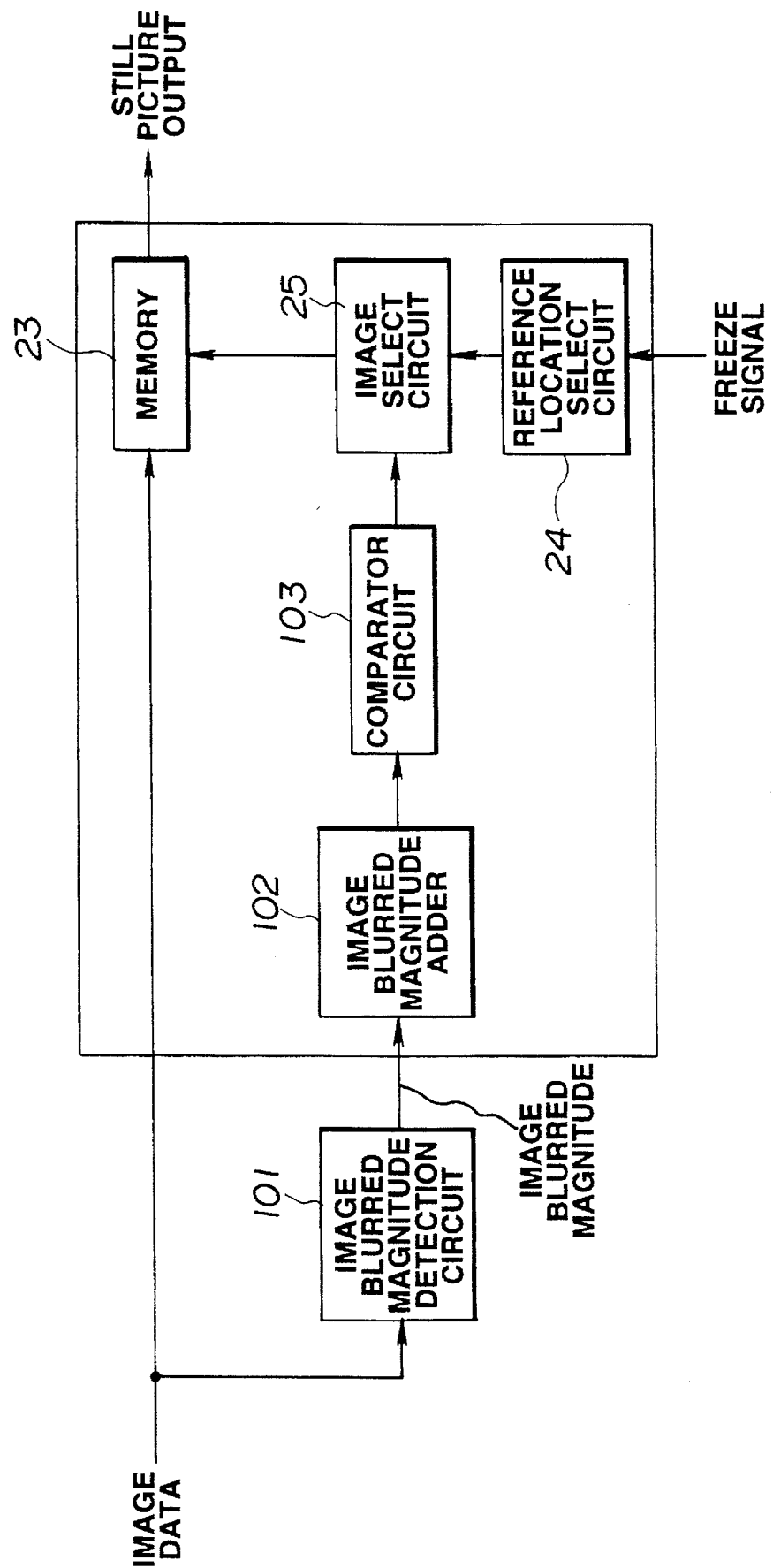

Namely, the freezing unit of the third embodiment, as shown in FIG. 18, comprises an image blurred magnitude detection circuit 101 for detecting the image blur for each pixel of the image data input, an image blurred magnitude adder 102 for accumulating the image blur for each pixel output from the detection circuit 101, from 54 to 230 lines in the virtual screen (hereinafter, referred as add mode, refer to FIG. 5), and detecting it as the blur added magnitude for one field, a memory for storing the blur added magnitudes for 16 fields, calculated at the adder 102, a comparator circuit 103, which is the same as in the first embodiment, for comparing the blur added magnitudes for sixteen fields, respectively, and searching a field with the least blur added magnitude.

Figure 19:
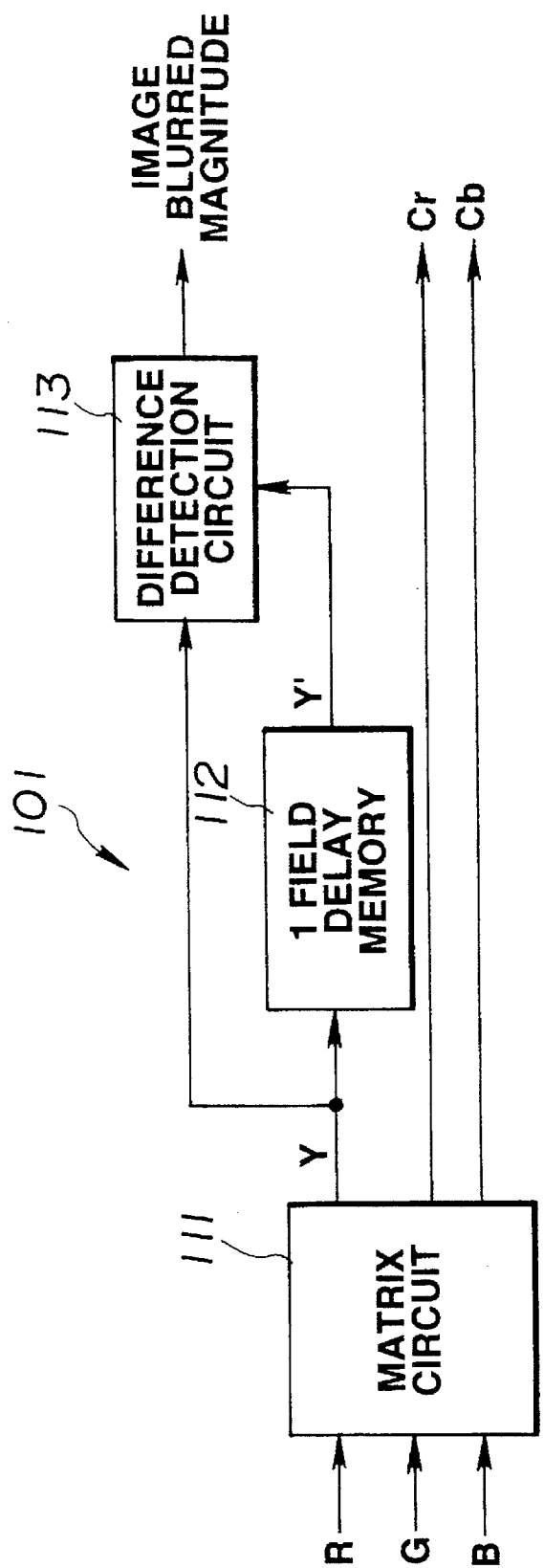

The image blurred magnitude detection circuit 101, as shown in FIG. 19, comprises a matrix circuit 111 for calculating two color signals Cr, Cb and a luminance signal Y from each component R, G and B of the image data, a one field delay memory 112 for delaying the luminance signal for one field, a difference detection circuit 113 for detecting the difference between the luminance signal Y and one field delayed luminance signal Y' as the blurred magnitude. Other configurations are the same as in the first embodiment.

The operation of the freezing unit configured in such manner, will be now described.

Each component R, G and B signal of the image data input is calculated as two color signals Cr, Cb and a luminance signal Y at the matrix circuit 111 in the image blurred magnitude detection circuit 101. Then, the difference between the luminance signal Y and one-field delayed luminance signal Y' delayed at the one-field delay memory 112, is detected as the image blurred magnitude by the difference detection circuit 113. The image blurred magnitude detected is detected as the image blur added magnitudes for one field by the image blurred magnitude adder 102, which functions in the same manner as the color discrepant magnitude detection circuit 21 of the first embodiment.

Figure 20:
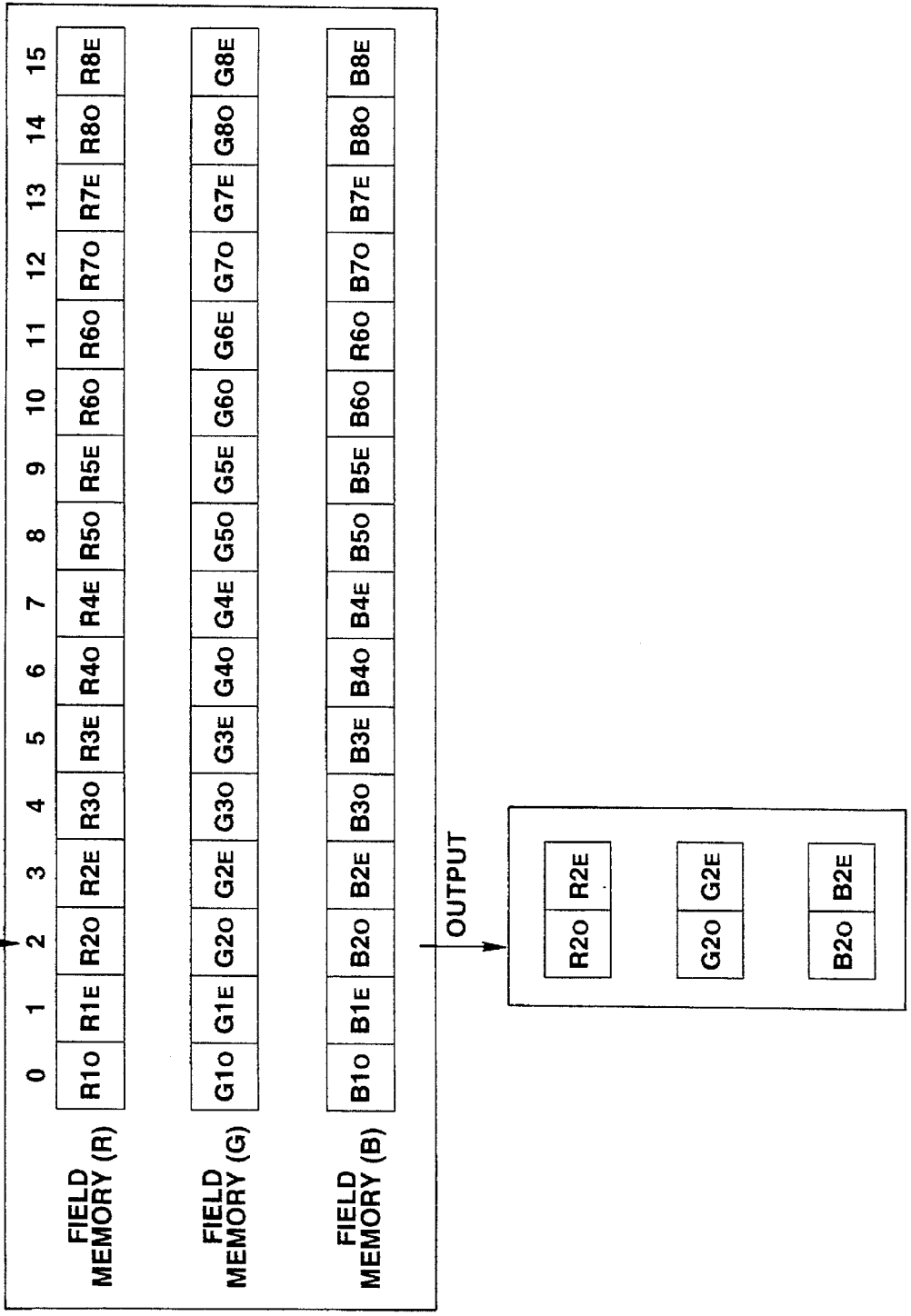

The operation of the memory 23 will be now described by reference to FIG. 20. As shown in FIG. 20, the image is written into field memories (R) 42, (G) 43 and (B) 44. The output, for example, when the field of address 2 is specified as a field with the least image blur value, outputs the image in the same frame including the field specified.

Other operations are the same as in the first embodiment. As described above, according to the freezing unit of the third embodiment, as in the first embodiment, in the event of the freezing operation, a field image data with the smallest amount of image blur is read out of the field image data for sixteen fields stored in the memory 23, at the object position in the comparison operation for the smallest amount of image blur field when the freeze signal is input, and output as a still image, so as to detect the image with the smallest amount of image blur regularly, and prevent the time lag until the image is output since the execution of the freeze command. A still image with the smallest amount of image blur is output in consideration of the time difference caused by a human's response time, and thereby the still image of the scene required can be easily obtained.

The fourth embodiment will now be described. The fourth embodiment is almost the same as the third embodiment, except for the configuration of the image blurred magnitude detection circuit, so only different configurations will be described. Thus, like configurations denote like reference characters, and the description will be omitted.

Figure 21:
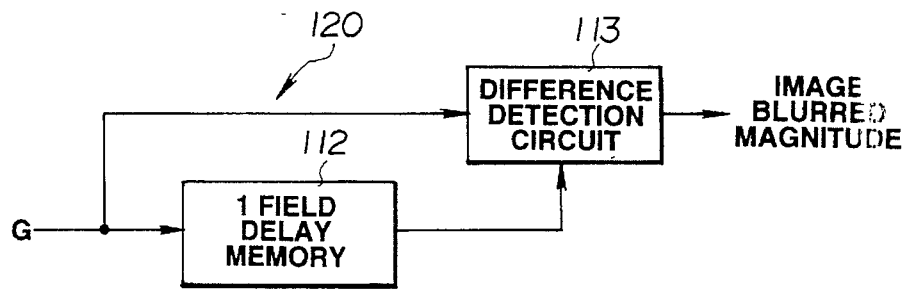
FIG. 21 is a block diagram illustrating the configuration of the image blurred magnitude detection circuit related to the fourth embodiment.

As shown in FIG. 21, the image blurred magnitude detection circuit 120 is configured without the matrix circuit 111. Other configurations are the same as in the third embodiment. The fourth embodiment of the freezing unit configured in such manner, will be now described.

The difference between, for example, the color signal G of the image data input, and one-field delayed G' at the one-field delay memory 112 is detected as the image blurred magnitude at the difference detection circuit 113, and output to the image blurred magnitude adder 102. Other operations are the same as in the third embodiment.

Consequently, in the third embodiment, two color signals Cr, Cb and a luminance signal Y are produced from RGB signals at the matrix circuit 111, and the detection of the image blur is carried out for the luminance signal Y, while in the fourth embodiment, the detection of the image blur can be carried out for the color signal G, for example, so in addition to the effect in the third embodiment, the scale of the circuit can be reduced.

The detection of image blurred magnitude was described to be carried out with color signal G, though, it is not limited to this, that may be either color signal R or B.

The fifth embodiment will be now described. The fifth embodiment is almost the same as the fourth embodiment, except for the configuration of the image blurred magnitude detection circuit. Thus, like configurations denote like reference characters, and the description will be omitted.

Figure 22:
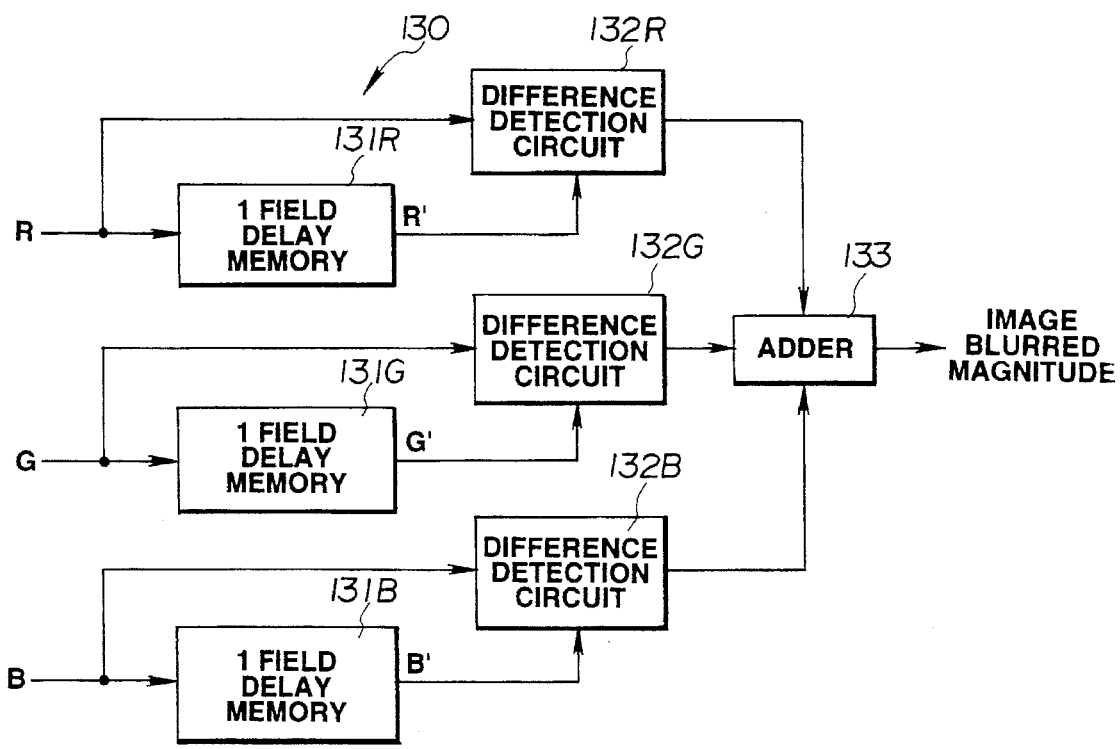
FIG. 22 is a block diagram illustrating the configuration of the image blurred magnitude detection circuit related to the fifth embodiment.

As shown in FIG. 22, the image blurred magnitude detection circuit 130 of the fifth embodiment comprises a one-field delay memory 131R for delaying a color signal R of the image data input for one field to produce a color signal R', a difference detection circuit 132R for detecting the difference between the color signal R and color signal R' delayed for one field as the image blurred magnitude, a one-field delay memory 131G for delaying a color signal G of the image data input for one field to produce a color signal G', a difference detection circuit 132G for detecting the difference between the color signal G and color signal G' delayed for one field as the image blurred magnitude, a one-field delay memory 131B for delaying a color signal B of the image data input for one field to produce a color signal B', a difference detection circuit 132B for detecting the difference between the color signal B and color signal B' delayed for one field as the image blurred magnitude, and an adder 133 for adding the differences in image blurred magnitude for each component of the difference detection circuits 132R, 132G and 132B. Other configuration will be the same as in the fourth embodiment.

The operation of the freezing circuit of the fifth embodiment configured in such manner, will be now described.

The differences between the color signals R, G and B of the image data input and the color signals R', G' and B' delayed for one field at the one-field delay memories 131R, 131G and 131B at the difference detection circuits 132R, 132G and 132B, are added at the adder 133, and detected as the image blurred magnitude and output to the image blurred magnitude adder 102. Other configuration will be the same as in the fourth embodiment.

According to the fifth embodiment, in addition to the effect of the third embodiment, in the third embodiment, the two color signals Cr, Cb and the luminance signal Y are produced from RGB signals at the matrix circuit 111, and the detection of the image blurred magnitude is carried out for the luminance signal Y, while this circuitry of the fifth embodiment can be more simplified, and more precise image with the least image blurred magnitude can be obtained than in the fourth embodiment, since the image blurred magnitude is detected from each R, G and B color signal.

The sixth embodiment will be now described.

Figure 23:
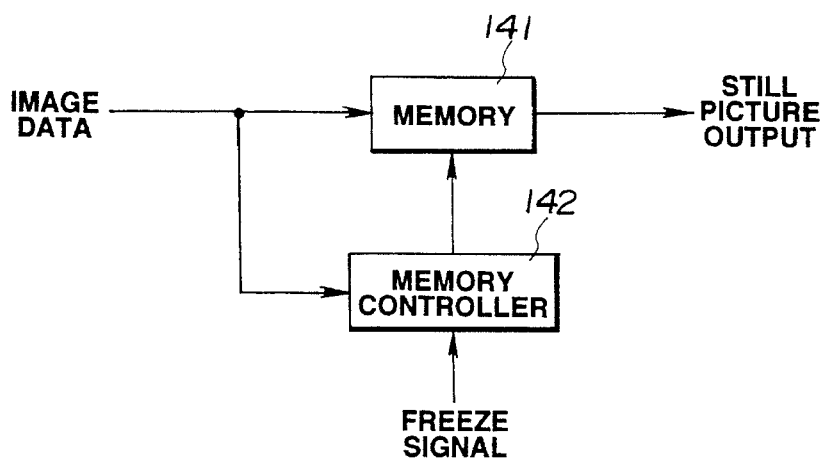
FIG. 23 is a block diagram illustrating the configuration of the freezing unit relating to the sixth embodiment.

The freezing unit in the sixth embodiment, as shown in FIG. 23, comprises a memory 141 for storing an image at a certain fixed time earlier, and a memory controller 142 for controlling the memory 141.

The operation of the freezing unit of the sixth embodiment configured in such manner, will be now described.

An image at a certain fixed time earlier, which is determined by the memory controller 142, that is, a human's response time earlier, preferably 0.3 sec. earlier, is stored in the memory 141. When the freezing signal is input, the image stored in the memory 141 is obtained. Namely, an image at the certain fixed time earlier can be obtained regularly whenever the freezing signal is input.

According to the sixth embodiment, in addition to the first embodiment, the scale of the circuit can be reduced. In each embodiment described above, the color discrepant magnitude or image blurred magnitude (hereinafter, referred as variation) before the freeze command is executed, is not necessarily compared, the variation about or after the execution of the command may be also compared, and the number of fields to be compared, and the reference position may be also changeable by an operator.

Further, in each embodiment described above, an image with the least variation is not necessarily selected, the variations below the determined value may be selected and the value may be also changeable by an operator. In the case of the variation below the determined value, either an image adjacent to a position where the freeze command is executed, or an image remote to the position may be selected.

Further, in each embodiment described above, the variation is not necessarily calculated from an original image, the variation may be calculated from an image stored in the memory 23 which is an image storage means, and the variation is not necessarily compared for each field, it may be carried out after the execution of the freeze command.

In each embodiment described above, the memory which is an image storage means can be removed for the purpose of reduction in cost.

While the invention has been described in its preferred embodiments, it is to be understood that different modifications and variations may be made in accordance with the invention without departing from the spirit or scope of the invention. The scope of the invention is not limited to particular embodiments but may be otherwise variously embodied within the scope of the following claims.

We claim:

1. An image freezing unit comprising:
   an imaging means for imaging an object;
   an image data storing means for storing image data consisting of a plurality of still images obtained by said imaging means;
   a variation calculation means for calculating the variation based on a relative position of said object and said imaging means on the basis of said still images consisting of said image data stored in said image data storage means;
   a variation latch means for holding said variation calculated by said variation calculation means;
   an image detection means for detecting said still image based on said variation held by said variation latch means; and
   a control means for controlling said image data storage means on the basis of the detected result of said image detection means.

2. The image freezing unit according to claim 1, wherein said variation calculated by said variation calculation means is calculated from said plurality of still images.

3. The image freezing unit according to claim 1, wherein said variation calculated by said variation calculation means is calculated from the image data of a plurality of fields or frames of said still images stored by said image data storage means.

4. The image freezing unit according to claim 1 or 2, wherein said variation latch means holds the predetermined number of said variations calculated by said variation calculation means, and said image detection means detects a still image with the less variation out of said determined number of variations held by said variation latch means.

5. The image freezing unit according to claim 1 or 2, wherein said variation latch means compares said variation held with the next variation to be calculated by said variation calculation means, and then holds the smaller variation.

6. The image freezing unit according to claim 1, 2 or 3, wherein said control means controls said image data storage means so as to output a still image with the least variation detected by said image detection means.

7. The image freezing unit according to claim 1, 2 or 3, wherein said control means controls said image data storage means so as to output images of which said variation detected by said image detection means is below the determined value.

8. The image freezing unit according to claim 7, further comprising an execution means for executing the production of said still image, wherein said control means controls said image data storage means so as to output images which are below said determined value immediately when executed by said execution means.

9. The image freezing unit according to claim 1, 2 or 3, wherein said control means controls said image data storage means so as to output an image which is stored in field unit, in the same frame.

10. The image freezing unit according to claim 1, further comprising a setting means for setting said plurality of fields or frames of images calculated by said variation calculation means upon receipt of the freeze command of said execution means.

11. The image freezing unit according to claim 1, 2 or 3, wherein said still image is a color image, and said variation is the color discrepant magnitude of said color image.

12. The image freezing unit aacording to claim 1, 2 or 3, wherein said variation is an image blurred magnitude.

13. The image freezing unit according to claim 12, further comprising a luminance signal extract means for extracting the luminance signal of said plurality of still images, wherein said variation calculation means calculates said image blurred magnitude from the variation in said luminance signal.

14. The image freezing unit according to claim 13, wherein said variation calculation means comprises:

a delay means for delaying said luminance signal for one field; and a difference detection means for detecting the difference between said luminance signal and a luminance signal delayed for one field by said delay means to calculate said image blurred magnitude.

15. The image freezing unit according to claim 12, wherein said still image is a color image, and said variation calculation means calculates said image blurred magnitude from the variation in at least one color signal of said color image.

16. The image freezing unit according to claim 15, wherein said variation calculation means comprises:

a delay means for delaying said color signal for one field; and a difference detection means for detecting the difference between said color signal and a color signal delayed for one field by said delay means to calculate said image blurred magnitude.

17. An endoscope image freezing unit comprising:

an endoscope having an imaging means for imaging an object;

an image data storage means for storing image data consisting of a plurality of still images obtained by said endoscope;

a variation calculation means for calculating the variation based on a relative position of said object and said imaging means on the basis of said still images composed of said image data stored in said image data storage means;

a variation latch means for holding said variation calculated by said variation calculation means;

an image detection means for detecting said still image based on said variation held by said variation latch means; and a control means for controlling said image data storage means on the basis of the detected result of said image detection means.

* * * * *